United States Patent [19]

Hayakawa et al.

[11] 4,412,514
[45] Nov. 1, 1983

[54] LOW NOISE LEVEL INTERNAL COMBUSTION ENGINE

[75] Inventors: Yoshikazu Hayakawa, Yokosuka; Naoki Ogawa, Yokohama, both of Japan

[73] Assignee: Nissan Motor Co., Ltd., Yokohama, Japan

[21] Appl. No.: 255,768

[22] Filed: Apr. 20, 1981

[30] Foreign Application Priority Data

Apr. 21, 1980 [JP] Japan .............................. 55-54256[U]

[51] Int. Cl.³ .............................................. F02F 7/00
[52] U.S. Cl. .............................. 123/195 R; 123/195 H; 384/428
[58] Field of Search ........... 123/195 R, 195 H, 195 S, 123/59 R; 308/22; 74/606

[56] References Cited

U.S. PATENT DOCUMENTS

| | | | |
|---|---|---|---|
| 2,739,574 | 3/1956 | Scheiterlein | 123/195 R |
| 2,752,896 | 7/1956 | Emele | 123/195 H |
| 3,568,649 | 9/1971 | Syson et al. | 123/195 R |
| 4,329,947 | 5/1982 | Ishihara | 123/195 H |

FOREIGN PATENT DOCUMENTS

| | | | |
|---|---|---|---|
| 661157 | 6/1938 | Fed. Rep. of Germany . | |
| 407612 | 11/1944 | Italy | 123/195 R |
| 361945 | 6/1962 | Switzerland | 123/195 R |
| 1294766 | 11/1972 | United Kingdom . | |

OTHER PUBLICATIONS

180 Automobiltechnische Zeitschrift, vol. 80, No. 5, p. 228; May 1978; Droscha; "Preisgekrönte Kurbelgehäuse-Konstruktion".
Patents Abstracts of Japan, JP-53-9913, vol. 2, No. 50, p. 412m78; Apr. 1978.

Primary Examiner—Craig R. Feinberg
Attorney, Agent, or Firm—Schwartz, Jeffery, Schwaab, Mack, Blumenthal & Koch

[57] ABSTRACT

An internal combustion engine having a cylinder block, comprises a bearing support beam structure secured to the cylinder block and including a plurality of main bearing carrying sections which are made of aluminum allow and incorporate with the corresponding sections of the cylinder block to rotatably support a crankshaft, and a steel pipe securely disposed within and in a manner to pierce the main bearing carrying sections, thereby lightening the weight of the entire engine, increasing the flexural rigidity of the cylinder block.

6 Claims, 7 Drawing Figures

LOW NOISE LEVEL INTERNAL COMBUSTION ENGINE

BACKGROUND OF THE INVENTION

This invention relates to a low noise level internal combustion engine, and more particularly to a bearing support beam structure securely connected to a cylinder block to rotatably support a crankshaft and improve the flexural rigidity of the cylinder block.

In connection with an internal combustion engine for use with an automotive vehicle, it has been proposed to employ a bearing support beam structure to be securely connected to the lower section of a cylinder block in a manner to rotatably support a crankshaft, in which main bearings are carried on the incorporated bearing support beam structure and cylinder block. By virtue of the bearing support beam structure, the flexural rigidity of the cylinder block can be increased, thereby decreasing engine noise emitted outside.

BRIEF SUMMARY OF THE INVENTION

According to the present invention, in an internal combustion engine having a cylinder block formed with a plurality of main bearing carrying sections, bearing support beam structure is secured to the cylinder block and includes a plurality of main bearing carrying sections which are made of aluminum alloy and incorporate respectively with those of the cylinder block. Additionally, a steel pipe securely disposed within and in a manner to piece the main bearing carrying sections of the bearing support beam structure.

With the thus arranged engine, the weight of the entire engine is considerably lightened, achieving the improvement in flexural rigidity of the engine. This greatly contributes to suppression in vibration generated in the cylinder block, thereby effectively decreasing engine noise emitted out of the engine.

BRIEF DESCRIPTION OF THE DRAWINGS

The features and advantages of the internal combustion engine according to the present invention will be clearly appreciated from the following description taken in conjunction with the accompanying drawings in which like reference numerals designate like part and elements, and in which.

DETAILED DESCRIPTION OF THE INVENTION

Figure 1:
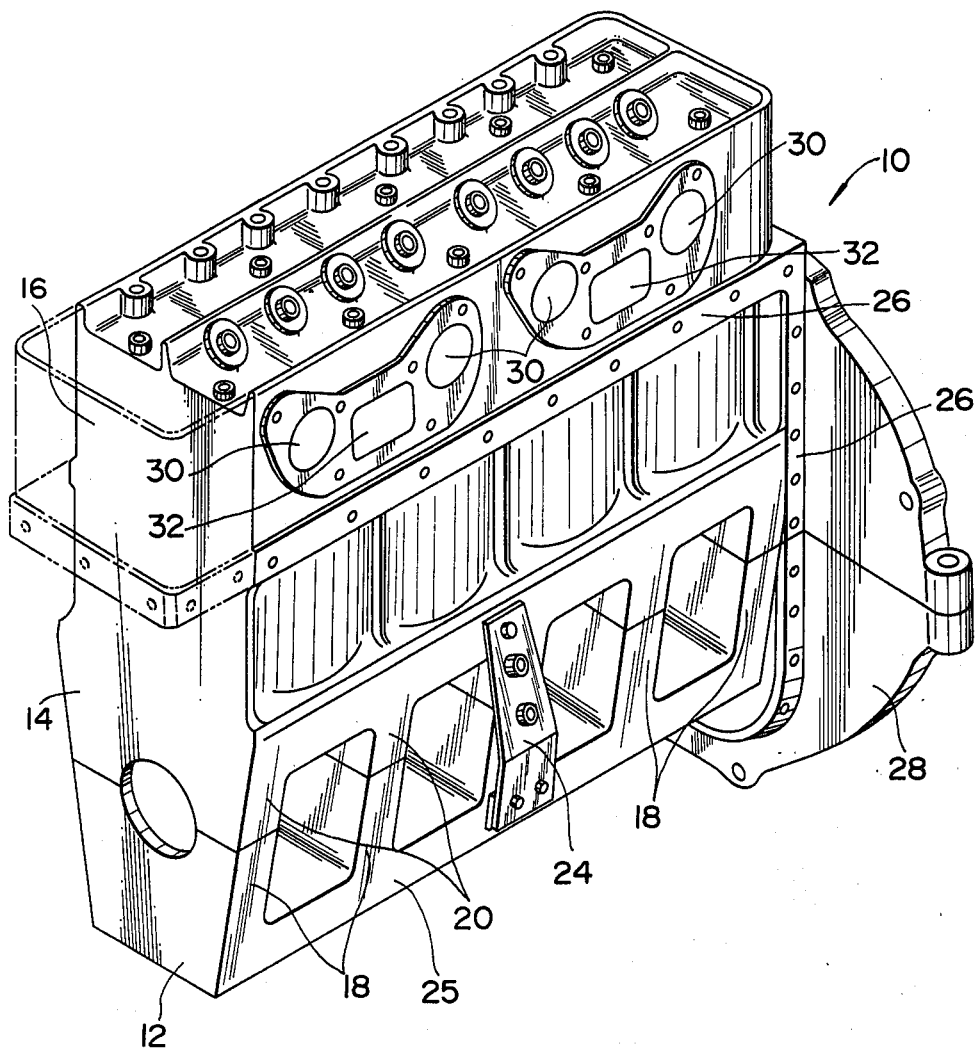
FIG. 1 is a perspective view of an essential part of an internal combustion engine with a conventional bearing support beam structure.

To facilitate understanding the present invention, a brief reference will be made to a conventional automotive engine 10, depicted in FIG. 1. Referring to FIG. 1, the conventional engine 10 is provided with a bearing support beam structure 12 fixed to a cylinder block 14 from standpoints of improving the rigidity of the cylinder block and suppressing engine vibration. In this instance, the cylinder block 14 is formed integrally with a cylinder head section 16. The bearing support beam structure 12 is formed with a plurality of parallelly aligned main bearing carrying sections 18 which cooperate respectively with a plurality of bulkheads or main bearing carrying sections 20 formed at the lower section of the cylinder block 14 to form a plurality of separate crank rooms 22. A crankshaft (not shown) is rotatably supported at its journals by main bearings (not shown) carried by the incorporated main bearing carrying sections 18, 22 of the bearing support beam structure 12 and the cylinder block 14, so that the crankshaft is rotatable within the crank rooms 22. The bearing support beam structure 12 is made, for example, of cast iron and formed integrally with five bearing carrying sections 18 which are positioned at equal intervals on a horizontal beam section 25 like the teeth of a comb. Additionally a fixing member 24 is provided to obtain further secure connection between the cylinder block 14 and the bearing support beam structure 12. The reference numeral 26 designates a gasket through which a crankcase cover (not shown) is securely connected to the cylinder block 14. The engine is further formed with a backplate 28 to which a transmission case (not shown) is connected. The cylinder head section 16 is formed at its side surface with intake ports 30 and exhaust ports 32.

Even with the thus arranged engine, the bearing support beam structure 12 tends to undergo deformation due to shearing stress in a vertical plane which shearing stress is caused by the unbalanced forces transmitted from the pistons and the crank system and explosion pressures. Therefore, it is necessary to increase the thickness of the rectangular beam section 25 of the bearing support beam structure 12 and additionally to employ other reinforcing means, in order to prevent the above-mentioned shearing deformation and obtain a sufficient flexural rigidity of the bearing support beam structure 12 in its longitudinal and lateral directions, preventing the bearing carrying sections 18 of the bearing support beam structure from collapsing or comming down.

It has been considered to make the bearing support beam structure with a light alloy such as aluminum alloy etc. in place of the conventional cast iron, for the purpose of decreasing the weight of the bearing support beam structure 12. This, however, cannot offer a sufficient flexural rigidity of the entire support beam structure 12 and sufficient rigidity to prevent bearing carrying sections 18 from collapsing, thereby causing lowering in buckling or collapsing strength and shearing deformation. As appreciated from the above, in such a conventional engine, rigidity improvement for vibration prevention has come into conflict with the desire for decreasing weight of the support beam structure.

Figure 2:
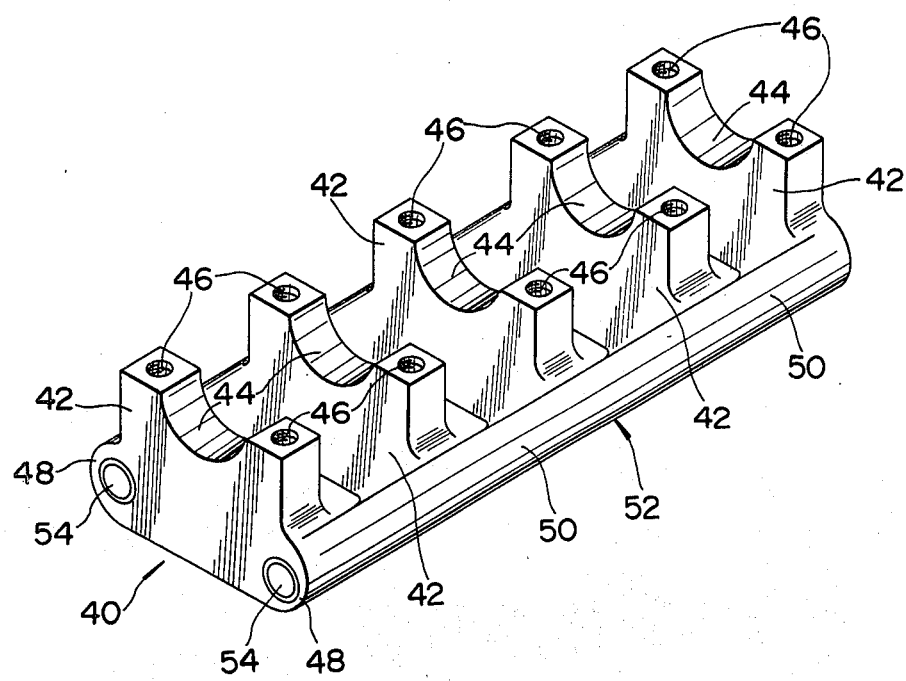
FIG. 2 is a perspective view of an example of a bearing beam support structure forming part of an internal combustion engine in accordance with the present invention.
Figure 3:
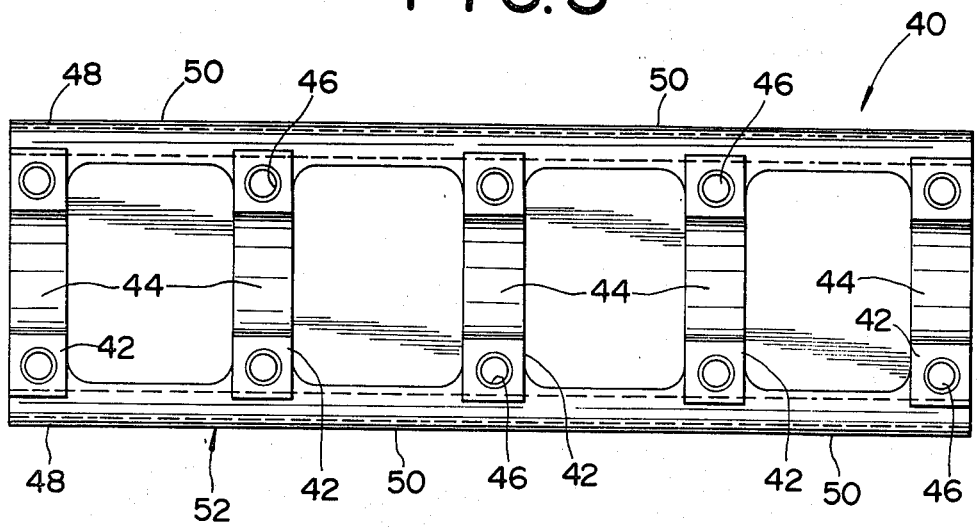
FIG. 3 is a plan view of the bearing beam support structure of FIG. 2.

In view of the above description of the conventional engine construction, reference is now made to FIGS. 2 to 7, and more particularly to FIGS. 2 and 3 wherein a preferred example of a bearing support beam structure 40 forming part of an internal combustion engine according to the present invention is illustrated, which engine is usable for an automotive vehicle. It is to be noted that only the bearing support beam structure 40 is shown in FIGS. 2 and 3 for simplicity of illustration, because this bearing support beam structure is replaceable with that shown in FIG. 1 and therefore usable in cooperation with the cylinder block 14 or the like. The bearing support beam structure 40 of this embodiment comprises a plurality of parallelly aligned vertical bearing carrying sections 42 which are positioned at equal intervals and made of aluminum alloy. Each bearing carrying section 42 is formed with a semicylindrical bearing carrying surface 44. The bearing carrying surface 44 carries thereon a main bearing which cooperates with a semicylindrical bearing carrying surface formed at the bottom section or bulkhead of a cylinder block 14 though not shown. The main bearings, as usual, rotatably support the journals of a crankshaft (not shown). The bearing carrying section 42 is further formed with two vertical threaded holes 46 in which screws are to be respectively screwed. The screws secure the bearing support beam structure to the bottom section of the cylinder block.

As shown, each bearing carrying section 42 is formed at the both sides of its lower portion with two projections 48 which laterally outwardly project, so that the projections 48 of the aligned bearing carrying sections 42 form two rows thereof at both sides of the lower section of the bearing support beam structure 40. It is to be noted that the thus aligned projections 48 in each row are integrally connected to each other with connecting portions 50 to form a continuous elongate side projection 52 which extends parallelly with the axis of the bearing support beam structure 40. A cylindrical hollow pipe 54 made of steel is integrally disposed within each continuous side projection 52 in a manner to pierce the side projection 52. The hollow pipe 54 is located in position during the casting of the bearing support beam structure 40.

With the thus arranged bearing support beam structure, the bearing carrying sections 42 are made of aluminum alloy and the high rigidity pipes 54 serve as the beams of this bearing support beam structure 40. This effectively achieves decreasing the weight of the bearing support beam structure 40 and additionally increasing the flexural rigidity not only of the bearing support beam structure but also of the entire engine. The increased rigidity prevents the bearing carrying sections 42 from its collapse and comming down, to a sufficient practical extent. This can suppresses the vibration of the entire engine, thereby preventing engine noise emission out of the vehicle. It will be understood that the steel pipes 54 are sufficiently higher in melting point than aluminum alloy and therefore no change in the steel pipe 54 occurs during the casting of the bearing support beam structure 40.

Figure 4:
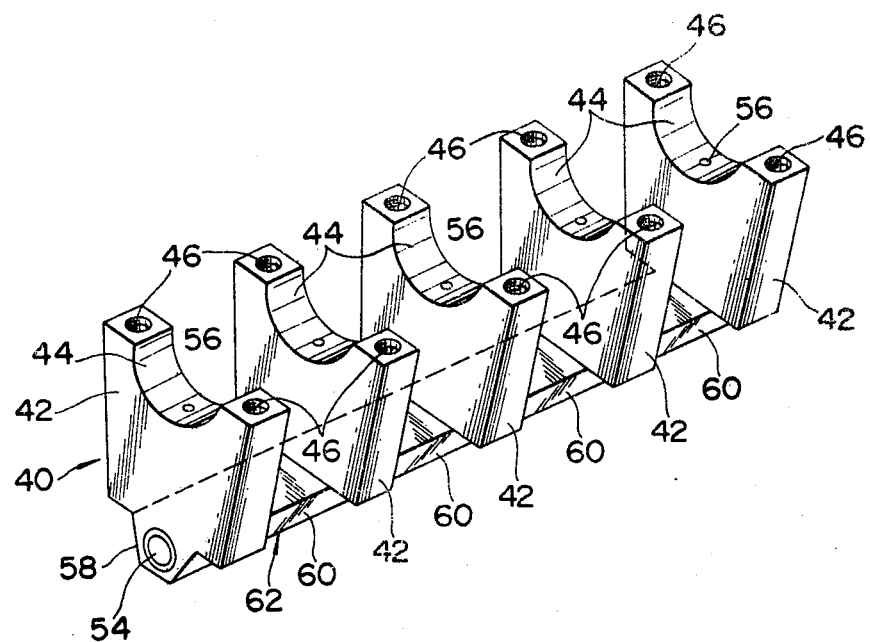
FIG. 4 is a perspective view of another example of the bearing support beam structure forming part of the engine in accordance with the present invention.
Figure 5:
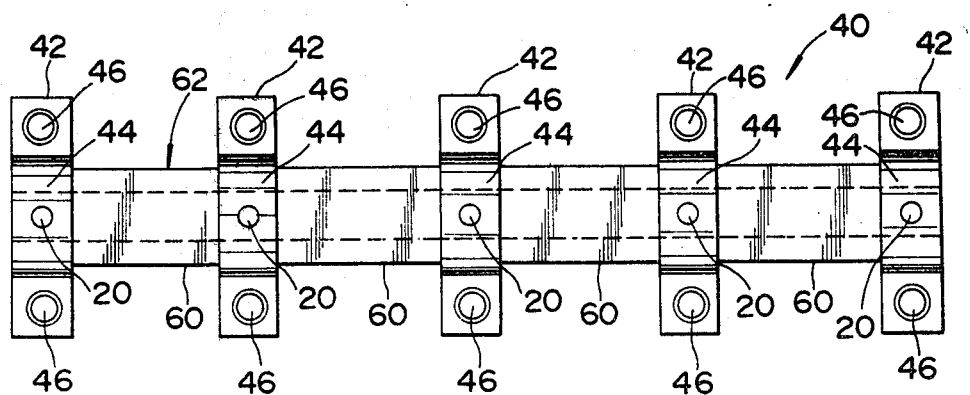
FIG. 5 is a plan view of the bearing support structure of FIG. 4.

FIGS. 4 and 5 illustrate another example of the bearing support beam structure 40 of the present invention. The bearing support beam structure 40 in this instance comprises a plurality of bearing carrying sections 42 which are parallelly aligned at equal intervals. Each bearing carrying section 42 is made of aluminum alloy and formed with semicylindrical main bearing carrying surface 44 and the screw holes 46 as in the embodiment of FIGS. 2 and 3. Additionally, each bearing carrying section 42 is formed at the bearing carrying surface 44 with a lubricating oil supply hole 56. Each bearing carrying section 42 is further formed at its bottom portion with a projection 58 which vertically and downwardly projects, so that the projections 58 of all the aligned bearing carrying sections 42 form a row thereof at the bottom portion of the bearing support beam structure 40. It is to be noted that the thus aligned projections 58 in a row are integrally connected to each other with connecting portions 60 to form a continuous elongate bottom ridge 62 which extends in the axial direction of and parallely with the axis of the bearing support beam structure 40. The steel pipe 54 is securely and integrally disposed within the continuous bottom ridge 62 in a manner to pierce the ridge 62, which steel pipe 54 has been put in position during the casting of the bearing support beam structure 40.

Also with the thus arranged bearing support beam structure 40, a light-weight engine can be attained with sufficient rigidity of the engine. This greatly contributes to supression of the vibration of the entire engine, and lowering of engine noise. It is to be noted that since the steel pipe 54 is positioned far from the screw holes 46, the steel pipe 54 can be used as an oil gallery in communication with the lubricating oil supply hole 56.

Figure 6:
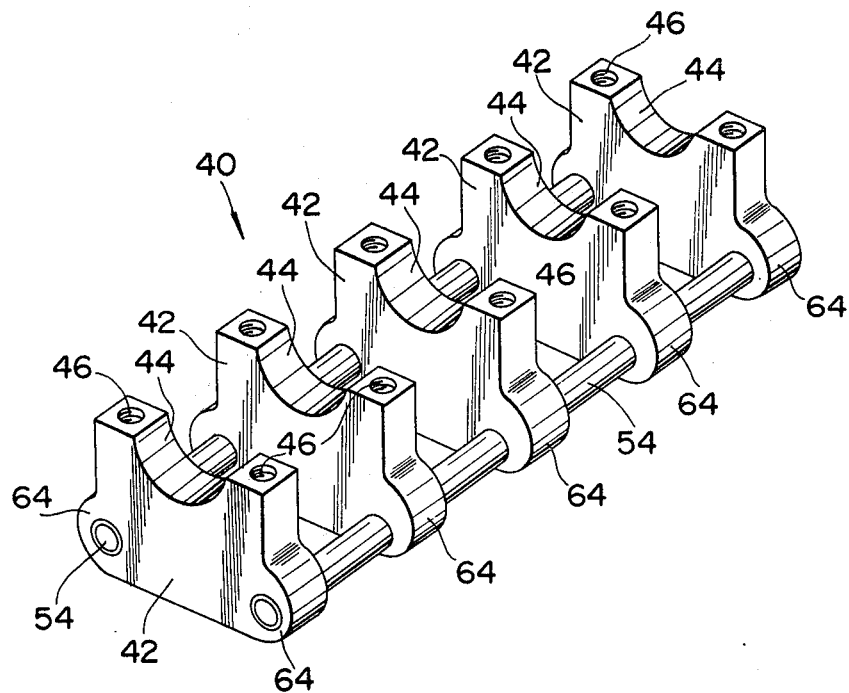
FIG. 6 is a perspective view of a further example of the bearing support beam structure in accordance with the present invention.

FIG. 6 illustrates a further modified example of the bearing support beam structure of the present invention. This bearing support beam structure 40 comprises six parallelly aligned vertical bearing carrying sections 42 made of aluminum alloy. As shown, each bearing carrying section 42 is independent and separate from each other. Each bearing carrying section 42 is formed at its both sides of the lower portion thereof with two opposite projections 64 which laterally and outwardly project, so that the projections align in two rows at the both sides of the lower portion of the bearing support beam structure 40. The steel pipe 54 is securely disposed in each row of the thus aligned projections 64, piercing all the projections 64 in a row. Accordingly, the sections, positioned between adjacent projections 64, of each steel pipe 54 are exposed as shown in the figure. The steel pipes 54 have been located in position during the casting of this bearing support beam structure 40.

With this arrangement, a lightweight engine can be attained while maintaining sufficient flexural rigidity of the engine. Furthermore, supporting the steel pipes 54 during casting becomes easier and therefore the productivity of the engine is improved, lowering the production cost thereof.

Figure 7:
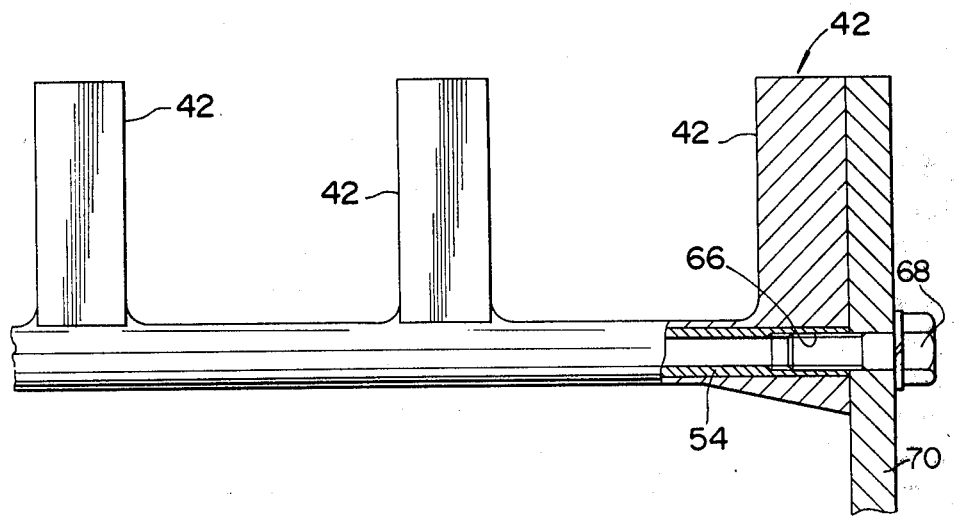
FIG. 7 is a side elevation, partly in section, of a further example of the bearing support beam structure forming part of the engine in accordance with the invention.

FIG. 7 illustrates a further example of the bearing support beam structure 40 of the present invention. In this example, the steel pipes 54 are securely disposed in the parallelly aligned bearing carrying sections 42 made of aluminum alloy, as shown in FIGS. 2 and 3. The steel pipes 54 have been disposed in position during the casting of the bearing support beam structure 40. Each steel pipe 54 is formed at the inner surface of both end sections thereof with screw-threaded sections 66 to which sections a bolt 68 is engageable. With this arrangement, screwing the bolt 68 into the end section of the steel pipe 54 results in a higher connection rigidity between the bearing support beam structure an a backplate 70 to which a transmission case (not shown) is connectable.

As appreciated from the foregoing, according to the present invention, the steel pipe is casted in a manner to pierce a plurality of the bearing carrying sections, made of aluminum alloy, of the bearing support beam structure. This decreases the weight and increase the rigidity of the bearing support beam structure, thereby greatly contributing to weight loss and enhanced rigidity of the entire engine. Accordingly, the vibration of the entire engine can be effectively suppressed, thereby decreasing engine noise.

What is claimed is:

1. An internal combustion engine having a cylinder block extending along a longitudinal axis and being formed with a plurality of main bearing carrying sections having downwardly facing ends, comprising:
   a bearing support beam structure extending along a longitudinal axis and being secured to the cylinder block and including a plurality of main bearing carrying sections having upwardly facing ends which are made of an aluminum alloy and which cooperate respectively with said main bearing carrying sections of the cylinder block, the longitudinal axis of said bearing support beam structure extending parallel to the longitudinal axis of the cylinder block; and
   a steel pipe securely disposed through and in contact with all the main bearing carrying sections of said bearing support beam structure and extending in parallel with the longitudinal axes of the cylinder block and said bearing support beam structure, wherein said main bearing carrying sections of said cylinder block are located above said main bearing carrying sections of said bearing support beam structure and are aligned along the longitudinal axis of the cylinder block with the ends of respective main bearing carrying sections being secured together and vertically disposed with respect to the cylinder block.

2. An internal combustion engine as claimed in claim 1, wherein said bearing support beam structure is made by casting during which said steel pipe is located in position.

3. An internal combustion engine as claimed in claim 1, wherein each main bearing carrying section of said bearing support beam structure includes a projection which is located at the bottom portion thereof to form a row of said projections which are integral with each other and aligned to form a straight elongate ridge which is parallel with the longitudinal axis of said bearing support beam structure, said steel pipe disposed within said straight elongate ridge and passing through each projection of said row of projections.

4. An internal combustion engine as claimed in claim 1, wherein each main bearing carrying section of said bearing support beam structure includes two projections which are located at opposite sides of the lower portion thereof to form two rows of said projections, said projections of a given row being spaced from each other, each row of said projections aligned to form a side projection oriented in parallel with the longitudinal axes of said bearing support beam structure and said cylinder block, said steel pipe disposed in one of said side projections in parallel with said longitudinal axis of said bearing support beam structure and passing through each projection of said corresponding one row of projections, said engine further comprising another steel pipe disposed in the other of said side projections in parallel with said longitudinal axis of said bearing support beam structure and passing through each projection of said corresponding other row of projections.

5. An internal combustion engine as claimed in claim 1, wherein each main bearing carrying section of said bearing support beam structure includes two projections which are located at opposite sides of the lower portion thereof to form two rows of said projections, each row of said projections forming an integral, straight, side projection aligned in parallel with the longitudinal axes of said bearing support beam structure and said cylinder block, said steel pipe disposed in one of said side projections in parallel with said longitudinal axis of said bearing support beam structure and passing through each projection of said corresponding one row of projections, said engine further comprising another steel pipe disposed in the other of said side projections in parallel with said longitudinal axis of said bearing support beam structure and passing through each projection of said corresponding other row of projections.

6. An internal combustion engine as claimed in claim 5, wherein said one and another steel pipes are each formed at the inner surfaces of at least one end section thereof with a screw-threaded section with which a screw-threaded section of a bolt is engageable to securely connect said bearing support beam structure to a structural member of the engine.

* * * * *